Patented Apr. 25, 1944

2,347,342

UNITED STATES PATENT OFFICE 2,347,342

SWITCH

Thomas W. Thirlwell, Mount Vernon, Ohio

Application April 20, 1942, Serial No. 439,756

1 Claim. (Cl. 200—59)

My invention relates to signaling devices for automotive vehicles, and has among its objects and advantages the provision of an improved direction signal switch.

An object of my invention is to provide a direction signal switch which is manually controlled for the purpose of selectively closing the circuits of the right and left signal lamps, in which the switch is semiautomatic in that the switch lever is automatically returned to its neutral position as an incident to turning of the steering wheel when bringing the vehicle into the straightaway, in which the switch is so designed as to be positive and silent in its operation, and in which the switch parts are well insulated to confine the current to the respective circuits.

In the accompanying drawings:

Figure 1 is a fragmentary view of a steering column and its steering wheel illustrating my invention applied thereto;

Figure 2 is a view taken from the position indicated by line 2—2 of Figure 1;

Figure 3 is a view taken from the position indicated by line 3—3 of Figure 1;

Figure 4 is a view similar to Figure 2 illustrating the switch lever in one of its signaling positions;

Figure 5 is an enlarged sectional view taken along the line 5—5 of Figure 2;

Figure 6 is a view similar to Figure 5 but illustrating the switch lever in one of its signaling positions;

Figure 7 is a perspective view of one of the switch lever returning arms;

Figure 8 is a diagrammatic view of the electric signaling circuit;

Figure 9 is an enlarged sectional view taken along the line 9—9 of Figure 3;

Figure 10 is a sectional view illustrating the manner of insulating certain parts of the switch structure; and Figure 11 is a view similar to Figure 9 but illustrating a modification.

In the embodiment selected for illustration, I make use of a metallic plate 10 in the nature of a segment of a washer secured edgewise to a housing 12 at the upper end of the usual steering column tube 14. This tube encloses the usual steering rod 16 turned through the medium of the steering wheel 18. L-shaped brackets 20 are riveted at 22 to the housing 12 and bolted at 24 to the plate 10 to fixedly secure the latter to and inside the housing 12. This plate parallels the plane of the steering wheel 18.

Figure 8 illustrates left and right turn signal indicating lamps 26 and 28, respectively, grounded at 30. The source of current 32 is grounded at 34 and is connected with a wire 36 common to the two lamps 26 and 28 and electrically connected with a contact 38 mounted on the plate 10. A wire 40 leads from the lamp 26 to a contact 42 of the switch, and a similar wire 44 leads from the lamp 28 to a switch contact 46.

Figures 3, 5 and 6 illustrate the contacts 42 and 46 as comprising straps of flexible material having their free ends lying between the contact 38 and the plate 10 and normally spaced from the contact 38. Contact 38 is also in the nature of a spring arm having one end fixedly secured to the plate 10 through the medium of screws 48. The common wire 36 is electrically connected with one of the screws 48, this screw having electrical engagement with the contact 38.

Figure 10 illustrates the screws 48 as being passed through a strip of insulation 50 lying against one face of the plate 10 and through insulating sleeves 52 in openings 54 in the plate 10. A strip of insulation 56 is positioned adjacent the opposite face of the plate 10 to constitute a mount for the contact 38, the screws 48 passing through aligned openings in the insulation 56 and this contact plate. All the parts are secured into a unitary structure through tightening of the bolt nuts 58.

The contacts 42 and 46 are mounted on insulation strips 60 clamped against the plate 10 by screws 62 passing through openings in the plate 10 and through insulation bodies 64 lying against the opposite face of the plate 10. The screws 62 are insulated from the plate 10 by sleeves in the same manner as the screws 48. One screw 62 of the contact 42 has the wire 40 electrically connected therewith, this screw being in electrical engagement with the contact 42. Similarly, one of the screws 62 of the contact 46 serves as a terminal for the wire 44, this screw being in electrical engagement with the contact 46.

A switch lever 66 lies against the face of the plate 10 opposite the contacts 38, 42 and 46 and is pivotally connected with the plate by a pin 68. Referring to Figures 5 and 6, the lever 66 is held snugly against the plate 10 by a strap 70 spaced from the plate by sleeves 72 mounted on bolts 74. A second strap 76 is held in spaced and parallel relationship with the strap 70 by means of sleeves 78 mounted on the bolts 74. Both the straps and the sleeves 72 and 78 are clamped into a unitary structure through tightening of the bolts 74, these bolts being threaded into the plate 10 as at 80. Between the straps 70 and 76 is interposed a circuit breaker T head 82. The short leg 84 of the T head is pivotally connected at 86 with the straps 70 and 76. A pin 88 is attached to the lever 66 between the pivots 68 and 86 and extends loosely through a slot 90 in the T head 82, see Figure 4.

To the outer ends of the arms 92 and 94 of the T head 82 are pivotally mounted lever returning arms 96. Figure 7 illustrates the arm 96 mounted on the arm 92. This arm is bent from a metal strap to provide spaced legs 98 and 100 between which the end of the arm 92 is freely receivable. A flange 102 projects upwardly from the arm 100 at one edge thereof and a second flange 104 projects upwardly from the opposite edge of the arm. The flange 102 is provided with an opening 106 for freely receiving one end of a spring wire 108 passing loosely through a slot 110 in the flange 104. The opposite end of the wire spring 108 is bent and inserted through an opening 112 in the arm 92 and is held in a bent condition by a pin 114 secured to the arm 92. A pin 116 pivotally connects the arm 96 with the arm 92 and the wire spring 108 yieldingly pivots the arm to the position of Figure 4, at which time the bight 117 of the arm engages the arm 92 to restrain the arm 96 from pivoting clockwise beyond the position of Figure 4. However, the arm 96 may pivot counter-clockwise. The arm 96 associated with the arm 94 is of identical construction so that corresponding reference characters identify the corresponding parts thereof. The only difference in the two arms lies in the fact that the flanges 102 and 104 are reversely positioned, since the arm 96 on the arm 94 is free to pivot in a clockwise direction but is restrained from pivotal movement in a counter-clockwise direction when positioned according to Figure 4.

In Figures 5 and 6, pins 118 are slidable in openings 120 in the plate 10. These pins have rounded upper ends normally projecting above the upper face of the plate 10 and are spaced so that the lever 66 may lie therebetween to be normally restrained from accidental pivotal movement. One pin 118 is insulated from the contact 42, as at 122, and this pin is normally held in the position of Figure 5 by the tension of the contact 42. The head 124 of the pin lies in engagement with the insulation 122 and constitutes a stop to restrain the pin from being projected upwardly beyond the position of Figure 5. Similarly, the head 124 of the other pin 118 lies in engagement with the insulation 126 on the contact 46. Contact 46 is also tensioned against the pin 118.

A third pin 128 is slidable in an opening 130 in the plate 10 and is yieldingly pressed against the lever 66 by a spring 132. Two recesses 134 are provided in the face of the lever 66 lying against the plate 10. These recesses selectively receive the latch pin 128 in the respective left turn and right turn positions of the lever 66. When the lever 66 is rotated in a counter-clockwise direction, as to the position of Figure 4, the lever engages one of the pins 118 and bends the contact 42 into engagement with the common contact 38 for closing the circuit through the left turn signal lamp 26. At this time the latch pin 128 extends into one of the recesses 134 in accordance with Figure 6. When the lever 66 is rotated in a clockwise direction from its normal position of Figure 5, the lever depresses the other pin 118 and bends the contact 46 into engagement with the common contact 38 at which time the latch pin 128 is projected into the other recess 134.

The hub structure of the steering wheel 18 is provided with two diametrically opposed lugs 136 for coaction with the arms 96 to return the lever 66 to its neutral position after a turn has been completed in either direction. Counter-clockwise rotation of the lever 66 imparts clockwise rotation to the T head 82, while clockwise rotation of the lever 66 imparts counter-clockwise rotation to the T head. One of the arms 96 is provided with a roller 138 which takes a position in the path of the lugs 136 when the lever 66 is shifted for illuminating the left turn lamp 26, while the other arm 96 is provided with a roller 140 which takes a position in the path of the lugs when the lever is pivoted for energizing the right turn lamp.

Figure 4 illustrates the left turn signaling position of the lever 66 and Figure 2 illustrates the normal positions of the rollers 138 and 140 which permits rotation of the lugs 136 without interfering engagement with either of the rollers 138 or 140.

With the lever 66 positioned according to Figure 4, the steering wheel may rotate counter-clockwise for left turn purposes without altering the position of the lever 66, since the arm 96 carrying the roller 138 is yieldably mounted for rotation in a clockwise direction, as when engaged by a lug 136. As the vehicle is brought into the straightaway, reverse rotation of the steering wheel brings a lug 136 into engagement with the roller 138, but rotating in a clockwise direction, so that the T head 82 is pivoted in a counter-clockwise direction to its normal position of Figure 2. The same action takes place when the lever 66 is pivoted to its opposite extreme position for energizing the right turn lamp.

Cam surfaces 142 are provided on the lever 66 to respectively engage the pins 118 when shifted to right and left signal indicating positions. A handle 144 is mounted on the lever 66. The housing 12 is provided with an opening 146 for the lever 66.

Figure 11 illustrates a modification of Figure 9 in that the plate 148 corresponding to the plate 10 is provided with lugs for connection with the housing 12. One such lug is illustrated at 150 lying in engagement with the housing 12 and fixedly secured by a screw 152.

Without further elaboration, the foregoing will so fully illustrate my invention, that others may, by applying current knowledge, readily adapt the same for use under various conditions of service.

I claim:

In switch mechanism of the character described, a pivoted arm, a pivot pin fixed on and projecting from one side of the arm, a stop projection on the arm spaced from the pivot pin, a U-shaped member having parallel legs connected by a web at one end, said legs being provided with aligned openings, said U-shaped member being mounted on the arm with the pivot pin extended through the apertures, a pair of flanges formed on the opposed longitudinal edges of one of the legs of said member, one of said flanges having a hole therethrough and the opposite flange having a slot, a spring wire extended transversely through the hole and slot of the respective flanges and engaging the projection on the arm to bias the U-shaped member to a predetermined position on the arm, and a roller rotatably mounted between the legs at the open end of the U-shaped member adapted to engage means operable to swing said member against the restraining action of the spring.

THOMAS W. THIRLWELL.